Patented Nov. 22, 1949

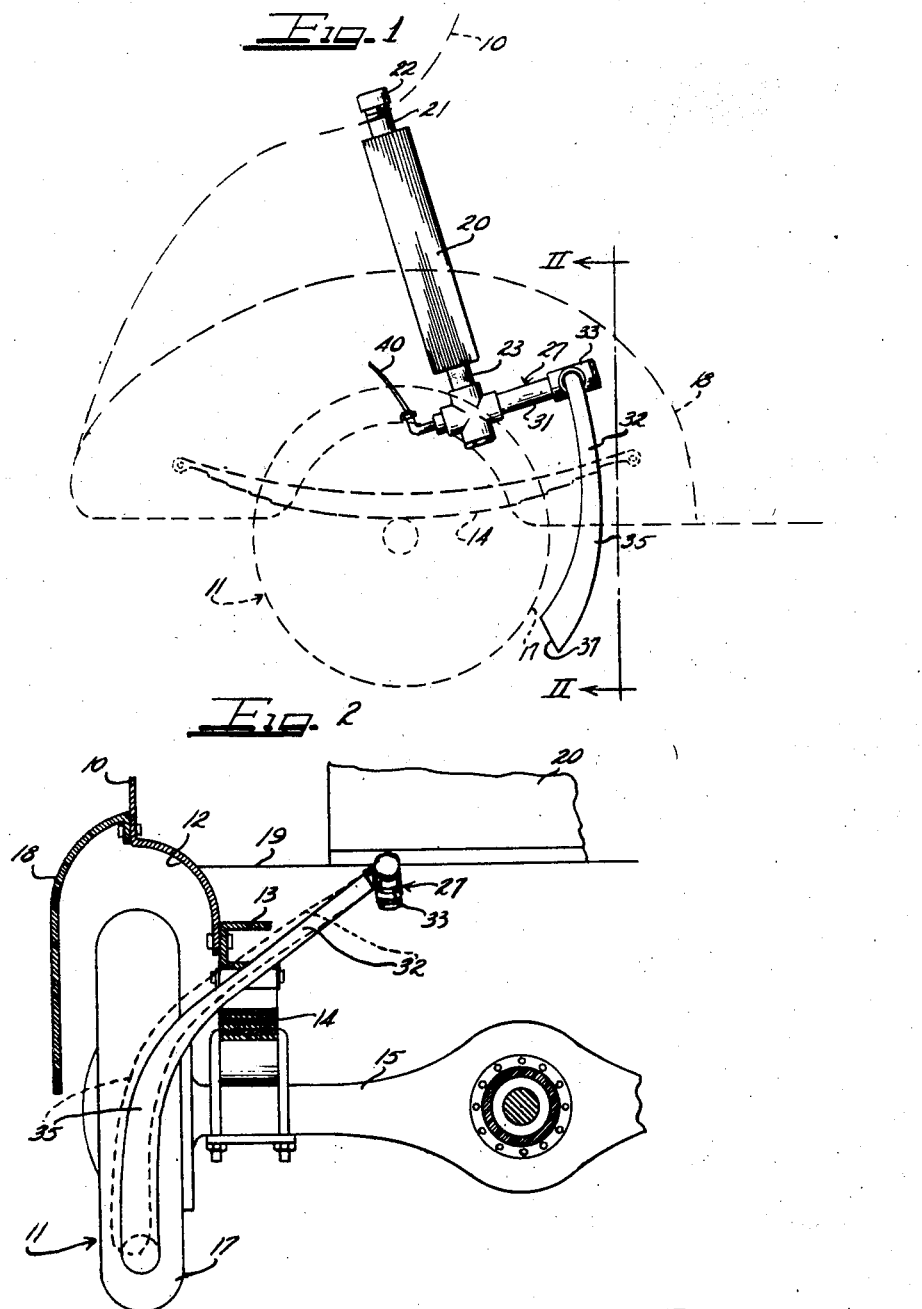

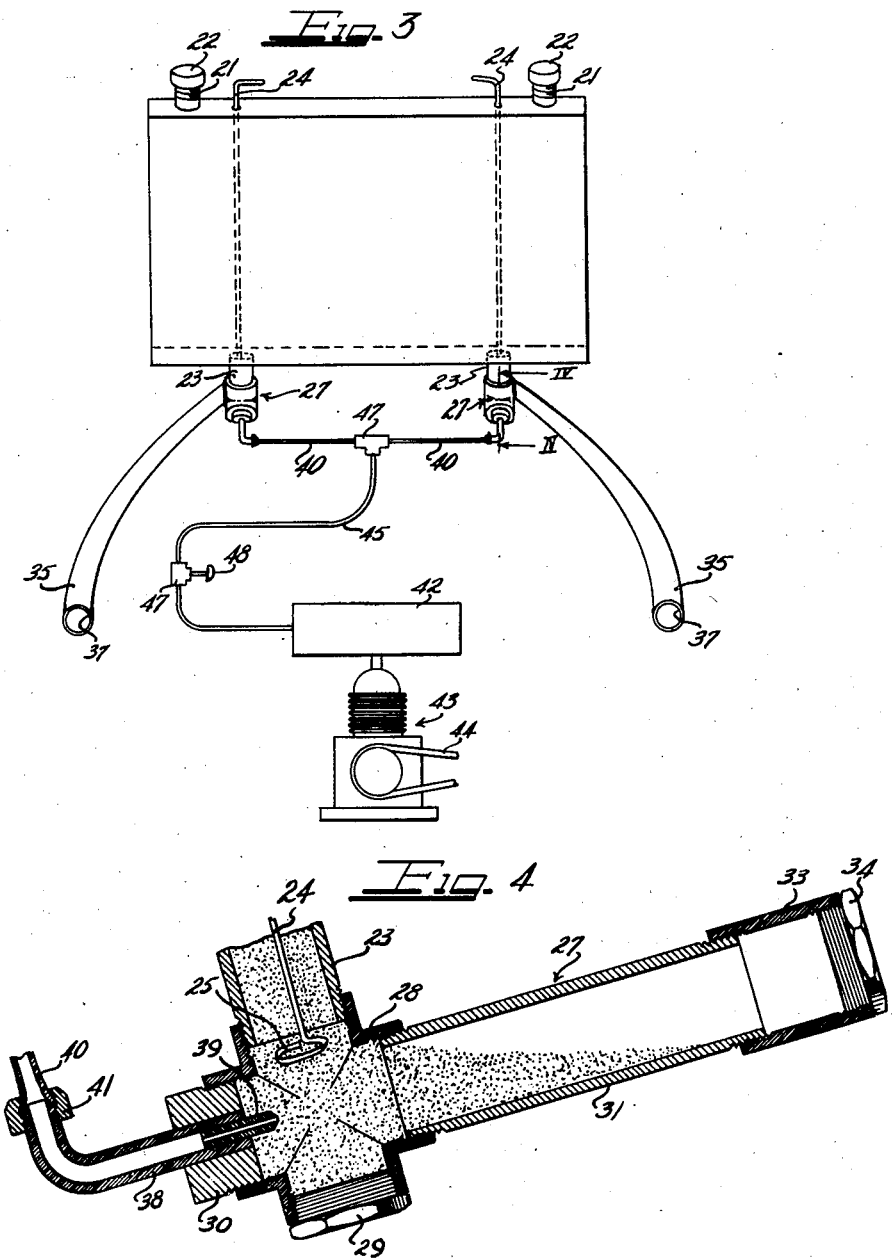

2,488,900

UNITED STATES PATENT OFFICE 2,488,900

VEHICLE TRACTION SANDER

Jack C. Deagan, Chicago, Ill.

Application June 29, 1948, Serial No. 35,875

5 Claims. (Cl. 291—3)

1

The present invention relates to improvements in sanding devices especially adapted for use with vehicles having sprung and unsprung portions considered as a general class and of which automobiles are an example.

Attempts have previously been made to provide sanding devices for vehicles whereby sand is delivered to the traction path of the wheels of the vehicle, generally the rear wheels, in order to afford motive or stoppage traction on slippery surfaces such as wet or icy pavements or rails.

At least two major difficulties have stood in the way of the provision of a truly successful vehicle traction sanding system of this character. The first of these has been the problem of keeping the sand supply dry, uncaked, and in a constantly fluid state so that it will be ready for delivery and disbursion in the traction path of a vehicle wheel when required, usually in cold weather and quite frequently in the presence of wet, slushy road conditions. The second and probably predominant problem has been that of maintaining the discharge openings or nozzles of the sanding device open and unclogged so that sand can be emitted therefrom as required. Since to be at all effective, the discharge nozzles of the device must be close to the wheels in front of which the sand is to be deposited, and thus with the nozzles opening directly in the path of splash from the wheels, clogging of the nozzles has been the common experience in slushy, freezing weather—just when the sanding device is generally most urgently needed.

Some prior attempts have been made to provide vehicle traction sanders usable with automobiles, wherein the exhaust gases of the vehicle have been relied upon for expelling the sand as required. This is a highly unsatisfactory expedient because in cold weather the moisture which is inherent in the gases of combustion dampens the sand and freezes, thus rendering the device inoperative during the period of possibly greatest emergency.

Another failing of prior devices has been that the discharge nozzles have customarily been fixed and rigid with the sprung portion or body of the vehicle and therefore become clogged with material splashed by the wheels, here again in the presence of road conditions when emergencies necessitating traction sanding are most likely to occur.

It will therefore be readily appreciated that there has been an urgent need for a practical vehicle traction sander that is adaptable for use with automobiles and the like and which will be fully operable under all manner of road conditions and in all kinds of weather.

An important object of the present invention is to provide a vehicle traction sander which will meet all of the problems of construction and operation to render the same fully satisfactory at all times irrespective of weather or road conditions that might tend to interfere with the operation of the sanding device or block it.

Another object of the invention is to provide a vehicle sander in which the sand is maintained at all times in a dry, fluid condition.

A further object of the invention is to provide improved means for supporting sand in a traction sanding device and available for instantaneous use.

Still another object of the invention is to provide improved means for effecting and controlling traction sanding propulsion in a traction sanding device.

Yet another object of the invention is to provide improved sand distribution means in a traction sanding device and which means is automatically maintained free from clogging of the discharge opening or nozzle thereof as a result of operation of the vehicle with which the device is associated.

It is also an object of the invention to provide for the novel, advantageous cooperative assembly of a traction sanding device with a vehicle in association with which the device is used.

Other objects, features and advantages of the present invention will be readily apparent from the following detailed description of a preferred embodiment thereof taken in conjunction with the accompanying two sheets of drawings in which:

Figure 1 is a more or less schematic side elevational view of a sanding device according to the present invention in association with a vehicle, the vehicle being shown in dash outline;

Figure 2 is a vertical sectional view taken substantially on the line II—II of Fig. 1;

Figure 3 is a schematic illustration of the sanding device and compressed air actuating means used therewith; and Figure 4 is an enlarged fragmentary vertical sectional view taken substantially on the line IV—IV of Fig. 3.

A sanding device according to the present invention may be utilized in association with either the rear wheels of a vehicle or with the front wheels, or with both, but in any event it is highly desirable to use the same with the traction wheels of the vehicle, such wheels normally comprising the rear wheels. The device is of such construction and arrangement that it can readily be accommodated in available storage space or at least free space in the vehicle, and operation of the device is of such nature that it can be controlled from the driver's seat of the vehicle.

A vehicle, such as an automobile, with which the sanding device may be utilized, comprises sprung and unsprung portions, that is, it includes a body structure 10 and a wheel assembly 11. The body includes the usual wheel wells at opposite sides as I indicated at 12 and is supported by a frame 13 carried by springs 14 which in turn are supported by an axle housing or structure 15 of the wheel assembly. The wheel assembly includes a pair of wheels 17 each of which may be at least partially concealed by the usual fender as identified at 18. Within the rear portion of the body 10 may be a storage compartment 19.

For purpose of illustration the rear portion of the vehicle has been chosen and the sanding device shown in association with the rear traction wheels 17 of the vehicle. For this purpose the sanding device comprises a sand storage vessel in the form of a flattened tank 20 which may be horizontally elongated and mounted within the storage compartment 19 of the vehicle adjacent to the innermost wall of the storage compartment with the major plane of the tank generally upright and preferably tilted downwardly and forwardly substantially as shown in Fig. 1. Adjacent to the opposite ends of the tank the upper edge or wall is provided with filling openings which may be defined by inlet tubes 21 having respective closure caps 22 thereon. The length of the tubes 21 may be such that they will extend out through the wall of the vehicle body for access exteriorly of the storage compartment 19.

Sand from the storage tank 20 is adapted to flow by gravity through respective outlets in the bottom wall of the storage tank defined by generally downwardly extending outlet ducts or pipes 23 having their axes extending parallel to the general plane of the tank, that is extending downwardly and generally forwardly at a suitable oblique angle, which is shown slightly exaggerated in Figs. 1 and 4. The outlet ducts 23 are preferably disposed adjacent to the opposite ends of the tank but spaced farther from said opposite ends than the inlet pipes 21. Thereby, agitator rods 24 accessible through the top wall of the tank can be manipulated to work respective agitating foot loop structures 25 thereon within the outlet ducts 23 to assure free flow of sand to the outlets and break up any clogging that may tend to occur in the sand within the outlets. By having the tank thoroughly sealed against moisture, dry sand therein will be kept in optimum flowable condition and it will be only on rare occasions that the agitators 24 may have to be used.

From the respective outlet ducts 23 sand is adapted to flow freely into respective gravity level holdbacks or sand traps 27. Each of the sand traps 27 comprises a branched coupling 28 threaded onto the lower end of the companion outlet duct 23 and closed at its lower end by means of a threaded cleanout plug 29. A plug 30 is threaded into the rearward opening of the coupling 28.

Extending forwardly and upwardly from the remaining branch of the coupling 28 is a sand trap tube 31 which is of such length with respect to its upward angle that the sand flowing under normal gravitational pull from the outlet duct 23 into the coupling 28 and thence into the tube 31 will find a normal flow level below the forward upper end of the trap tube. This automatically restrains undesired escape of sand from the trap. By having the outlet duct 23 in each instance and the associated coupling 28 and trap tube 31 of relatively large capacity, depending, of course, upon requirements, a substantial volume of sand will at all times be present in the sand trap during the inactive condition of the system.

As best seen in Fig. 1, the forward end of the sand trap 27 is preferably disposed at a substantial elevation, such for example as at least as high as or above the uppermost periphery of the wheel 17. In addition, the sand trap is located at a substantial distance inwardly from, though relatively adjacent to, the spring 14 nearest the wheel which is to be supplied with traction sand in each instance. Through this arrangement, a sand delivery duct and nozzle structure 32 leading laterally and downwardly from a T-coupling 33 at the forward end of the sand trap tube 31 is afforded a relatively long continuously inclined path from the forward end of the sand trap down over the spring 14 and into position in appropriate relatively closely spaced relation forwardly of the wheel 17. The forward opening in the coupling 33 is preferably closed by a threaded clean out plug 34. If desired, of course, the sand trap may be formed as a one piece unit with appropriate openings and nipple bosses thereon, as required. The present disclosure follows generally a construction which has been used in actual practice and found eminently satisfactory.

The sand delivery duct 32 is preferably in the form of a resilient, flexible hose which may be made of rubber or the like and is of enlarged cross sectional flow area and thus external diameter toward its lower outlet end as indicated at 35 to provide a nozzle having a relatively large mouth 37 directed generally toward the forward traction bight between the wheel 17 and the traction surface over which traveling. The height of the nozzle mouth 37 may be as desired, but has been found to be adequately located when below the horizontal diametral plane through the wheel and with its discharge axis directed into the angle between the wheel and the traction surface.

Sand in the trap 27 in each instance is propelled by means of compressed air into and through the sand tube 32 to discharge from the nozzle mouth 37 thereof into the traction path of the wheel. To this end, the plug 30 (Fig. 4) is fitted with a central fitting 38 carrying at its forward or inner end a small bore nozzle or jet member 39 which projects to only a very short distance into the sand trap chamber within the coupling 28. This short projection of the jet 39 assures that a blast of air therefrom will act upon a maximum accumulation or body of sand in the trap so as to propel a copious quantity of the sand into and through the sand delivery tube 32. By having the bore of the nozzle or jet 39 quite small, and delivering compressed air under high pressure thereto as required, a very high velocity air blast is delivered from the jet for propelling the sand. In practice it has been found that highly satisfactory results are attained by having the bore of the jet of a size which is obtained by drilling the bore with a #53 drill which is a standard size of approximately .0595 inch diameter.

The fitting 38 affords means for coupling a compressed air tube 40 to its outer end as by means of a coupling nut 41. Compressed air is derived from a suitable tank 42 (Fig. 3) within which pressure may be maintained by means of a compressor unit 43 driven in any suitable fashion as by means of a belt 44 connected to a moving part of the vehicle power unit as for example the crankshaft of the vehicle. Where desired, of course, the tank 42 may be fitted with inlet valve means adapting it to be filled from a service station air hose customarily provided for filling pneumatic tires.

From the compressed air tank 42 compressed air is delivered by means of a duct or conduit 45 leading to a branch coupling 41 to which are connected the compressed air lines 40 for the respective sides of the system. In the compressed air line 45 is a valve 47 of normally closed type which is adapted to be opened by pressing upon a button or plunger 48 preferably located on the floor of the vehicle adjacent to the control pedals of the vehicle in much the same manner as the conventional automobile light dimmer switch so that the operator of the vehicle can operate the valve 47 by stepping on the plunger 48 whenever sand is required for the wheels.

It will be appreciated that since the pressure of the compressed air blast issuing from the respective jets 39 is relatively powerful and of high velocity, the sand in the trap 27 in each instance is propelled with great speed and substantial force into and through the sand delivery duct 32 and from the nozzle mouth 37 and will thus reach the traction path of the wheels virtually instantaneously upon pressing of the air valve plunger 48. Moreover, since the sand freely flows through the respective outlet ducts 23 into the sand traps 27, there will be a continuous and copious supply of sand delivered to the wheels as long as the supply lasts and the air valve plunger is depressed. Ordinarily, of course, only a relatively brief demand for sand will be sufficient to afford necessary traction for the vehicle for propulsion or anti-skid purposes.

One of the salient features of the present invention resides in the arrangement whereby the nozzle mouth 37 in each instance is maintained free from clogging debris or dirt or slush that may be splashed thereon in the operation of the wheel 17, and the passage of the sand supply tube 32 is maintained at all times clear and open so as to be ready continually for instantaneous sand delivery in every emergency. This is accomplished by having the receiving end of the tube 32 carried by or in association with the sprung portion of the vehicle while the delivery or discharge portion of the sand tube 32 is associated with the unsprung portion of the vehicle. Hence, during the operation of the vehicle the sand delivery tube 32 is constantly jostled and agitated in accordance with relative movements of the sprung and unsprung portions due to unevenesses in the surface or roadway over which the vehicle is traveling. To this end, the tank 20 and the sand trap 27 are carried by and move fixedly with the sprung portion or body of the vehicle, while the laterally extending sand delivery tube 32 is supported intermediate its ends by the unsprung portion of the vehicle as, for example, upon the spring 14 over which it is directed. Where the spring is not conveniently located any other appropriate part of the unsprung portion of the vehicle may be used or a supporting bracket may be attached to the unsprung vehicle portion for the purpose.

Support of the flexible tube 32 on the unsprung portion or spring 14 is preferably loose or relatively unsecured so that the tube may bounce and jostle rather freely and thus be virtually constantly agitated while the vehicle is in motion and more or less violently jarred from time to time as it beats against the spring. The results of jarring movement are shown more or less schematically by the full and dash outline positions of the tube 32 in Fig. 2. In this manner splash from the wheel 17 is jarred and jostled free from the nozzle portion 35 of the sand delivery tube and especially from the discharge opening 37 as the nozzle portion whips and snaps as a result of bouncing of the delivery tube with respect to the intermediate support provided by the spring. Since the entire length of the tube 32 is repeatedly flexed clogging of sand therein is positively inhibited. In actual practice it has been found that under the worst imaginable slushy road conditions long distances may be traveled without any danger of clogging of the tube 32 or the discharge opening 37. Therefore, the sanding device is ready to function at all times irrespective of conditions which would cause a sand delivery nozzle fixed with relation to the sprung portion of the vehicle to become clogged and useless.

Although there has been specifically illustrated the manner in which the sand delivery tube 32 may be supported in jarring, jostling, whipping relation to the spring assembly of the unsprung portion of the vehicle, any other appropriate part of the unsprung portion of the vehicle or fixture thereon may be utilized for this purpose, so long as agitation of the tube and more particularly the discharge end portion thereof is accomplished during operation of the vehicle.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a vehicle having sprung and unsprung portions and wherein the unsprung portion has supporting wheels, a traction sander having a sand container supported by the sprung portion of the vehicle inside and above the wheels, and a sand delivery duct of resilient flexible characteristics connected to and extending laterally and downwardly from said container and supported intermediate its ends by lying loosely on the unsprung portion of the vehicle, said duct having the end portion thereof beyond and below the point of loose support directed to deliver sand to the traction path in front of one of the wheels and being subjected to bouncing and jostling upon and against the unsprung portion at the point of support with a beating impact action incident to agitation of the unsprung portion as the wheels travel over an uneven roadway, whereby said end portion of the duct is violently whipped and jarred free from matter splashed thereon by the wheel.

2. In combination in a vehicle having sprung and unsprung portions wherein the unsprung portion has supporting wheels and springs adjacent to the wheels to support the sprung portion on the unsprung portion, an emergency sanding device supported by the sprung portion of the vehicle, flexible said delivery tubes connected to the sand device and directed into operative relation to the wheels and supported at an intermediate point thereof relatively loosely by the springs and being free to bounce upwardly away from and beat down against the supporting springs responsive to agitation of the springs incident to travel of the vehicle over an uneven roadway, so that the portions of the tubes adjacent to the wheels are jarred and whipped free from material splashed thereon by the wheels.

3. In an automotive vehicle including an unsprung portion having traction wheels and a sprung portion carried by the unsprung portion, a sand container on the sprung portion of the vehicle and having resiliently flexible rubber-like sand delivery tubes connected to and extending therefrom and provided with discharge nozzles located adjacent to and forwardly from the road engaging lower portion of the traction wheels, said tubes being in loose contact at an intermediate point of their lengths with the unsprung portion of the vehicle at a substantial distance from said discharge nozzles and being free to bounce relative to said unsprung portion for whipping agitation of the discharge nozzle portions thereof incident to travel of the vehicle over a roadway and more especially road-induced movements of the unsprung portion of the vehicle in travel whereby the discharge nozzle portions of the tubes are at all times clear and open due to being constantly jostled free of splash from the respective wheels, and means for impelling sand through said tubes from said container, the portions of the tubes from the discharge nozzle ends thereof to approximately contact with the unsprung portion of the vehicle being of greater cross-sectional flow area than the remainder of the tubes.

4. In combination in sanding apparatus for a vehicle including sprung and unsprung portions and wherein the unsprung portion includes supporting wheels and a structure disposed in spaced adjacency to one of the wheels and at a substantial elevation above the bottom of the wheel, means providing a sand container arranged to be carried by the sprung portion of the vehicle and at an elevation above said structure, and a resiliently flexible delivery tube connected to and extending from said container to a discharge point located adjacent to the front of said one wheel of the unsprung portion of the vehicle, said tube being loosely supported intermediate its ends by said structure and having a substantial portion thereof from the point of loose support to the discharge point free of support and adapted to bounce from and beat against the supporting structure of the unsprung portion as an incident to up and down agitation of the unsprung portion when traveling over the usual uneven roadway whereby to whip and snap the discharge end portion of the delivery tube and thereby maintain the same free from material splashed thereon by the wheel.

5. In combination in sanding apparatus for a vehicle including sprung and unsprung portions and wherein the unsprung portion includes supporting wheels and a structure disposed in spaced adjacency to one of the wheels and at a substantial elevation above the bottom of the wheel, means providing a sand container arranged to be carried by the sprung portion of the vehicle and at an elevation above said structure, a sand trap connected to the container, a resiliently flexible delivery tube connected to and extending from said sand trap to a discharge point located adjacent to the front of said one wheel of the unsprung portion of the vehicle, said tube being loosely supported intermediate its ends by said structure and having a substantial portion thereof from the point of loose support to the discharge point free of support and adapted to bounce from and beat against the supporting structure of the unsprung portion as an incident to up and down agitation of the unsprung portion when traveling over the usual uneven roadway whereby to whip and snap the discharge end portion of the delivery tube and thereby maintain the same free from material splashed thereon by the wheel, and air blast means controllable at the will of the operator of the vehicle and discharging into and through said sand trap to drive sand from the trap into and through said delivery tube.

JACK C. DEAGAN.

REFERENCES CITED

The following references are of record in the file of this patent:

UNITED STATES PATENTS

| Number | Name | Date |
|---|---|---|
| 488,387 | Crory | Dec. 20, 1892 |
| 950,889 | Beattie et al. | Mar. 1, 1910 |
| 1,202,871 | Meissner | Oct. 31, 1916 |
| 1,842,506 | Brueggeman | Jan. 26, 1932 |
| 2,137,917 | Lintern | Nov. 22, 1938 |
| 2,207,169 | Todd | July 9, 1940 |
| 2,223,722 | Farrell | Dec. 3, 1940 |

FOREIGN PATENTS

| Number | Country | Date |
|---|---|---|
| 12,593 | Great Britain | July 31, 1902 |